United States Patent [19]
Fletcher

[11] 3,883,436
[45] May 13, 1975

[54] PHYSICAL CORRECTION FILTER FOR IMPROVING THE OPTICAL QUALITY OF AN IMAGE

[76] Inventor: James C. Fletcher, Administrator of the National Aeronautics and Space Adminstration with respect to an Invention of Shui Yee Lee, Washington, D.C.

[22] Filed: July 16, 1971

[21] Appl. No.: 163,151

[52] U.S. Cl. .......... 250/566; 178/DIG. 25; 350/311
[51] Int. Cl. ....................................... G01n 21/30
[58] Field of Search ............... 350/3.5, 162 SF, 311; 250/209, 219 QA, 219 FR; 178/DIG. 25, DIG. 34; 96/44; 333/70 T

[56] References Cited
UNITED STATES PATENTS

| | | | |
|---|---|---|---|
| 2,855,539 | 10/1958 | Hoover, Jr. | 250/220 |
| 2,945,132 | 12/1960 | Schuech | 250/220 |
| 2,972,012 | 2/1961 | Farber | 178/DIG. 25 |
| 3,017,515 | 1/1962 | Welch | 250/209 |

FOREIGN PATENTS OR APPLICATIONS

| 893,655 | 4/1962 | United Kingdom | 250/209 |
|---|---|---|---|

OTHER PUBLICATIONS

Murray: Method for Real-Time Television Enhancement Processing, Published June 15, 1971, RCA Tech. Notes No. 886.

Brown: A New Cripner Circuit for Television Images, Jour. SMPTE, Vol. 72, pp. 849-853, Nov. 1963.

*Primary Examiner*—Ronald J. Stern
*Attorney, Agent, or Firm*—Monte F. Mott; Paul F. McCaul; John R. Manning

[57] ABSTRACT

A family of physical correction filters is described. Each filter is designed to correct image content of a photographed scene of limited resolution. Each filter includes a first filter element with a pinhole through which light passes to a differential amplifier. The filter also includes a second filter element through which light passes through one or more openings, whose geometric configuration is a function of the cause of the resolution loss. The light, passing through the second filter element, is also supplied to the differential amplifier whose output is used to activate an optical display or recorder to reproduce a photograph or display of the scene in the original photograph or display of the scene in the original photograph with resolution which is significantly greater than that characterizing the original photograph.

8 Claims, 23 Drawing Figures

FIG. 1
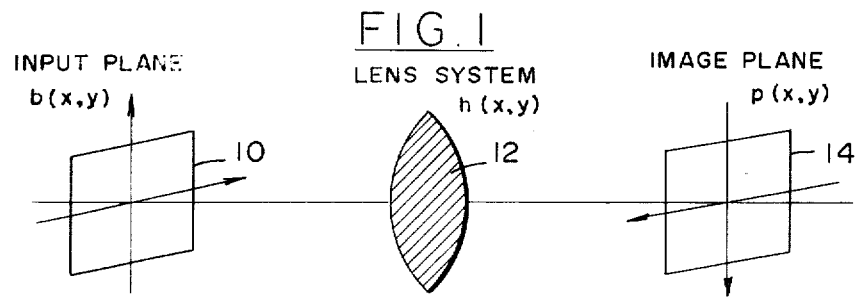
INPUT PLANE b(x,y) — LENS SYSTEM h(x,y) — IMAGE PLANE p(x,y)
FIG. 2
| OPTICAL SYSTEM | INPUT PLANE | IMAGE PLANE |
|---|---|---|
| DEFOCUS | · | ● |
| LATERAL SHIFT | · | · · |
| RING SMEAR | · | ○ |
| LINEAR SMEAR | · | — |
FIG. 3
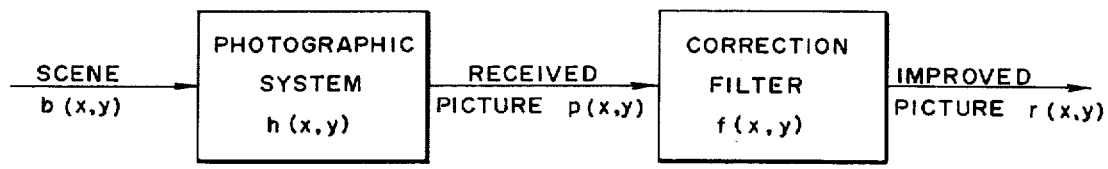
SCENE b(x,y) → PHOTOGRAPHIC SYSTEM h(x,y) → RECEIVED PICTURE p(x,y) → CORRECTION FILTER f(x,y) → IMPROVED PICTURE r(x,y)
FIG. 3a
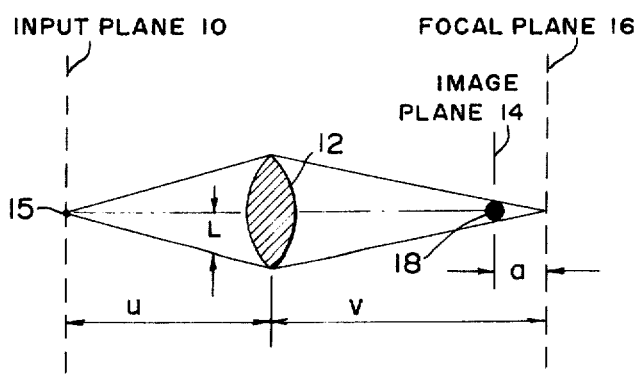
SHUI YEE LEE
*INVENTOR.*
BY
*Monte F. Mott*
ATTORNEYS

SPATIAL FREQUENCY

INVENTOR.
SHUI YEE LEE

BY Monte F. Mott

ATTORNEYS 3,883,436

INVENTOR.
SHUI YEE LEE

BY
Monte F. Mott
ATTORNEYS

0
PHYSICAL CORRECTION FILTER FOR IMPROVING THE OPTICAL QUALITY OF AN IMAGE

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention:

The present invention relates to optical systems and, more particularly, to systems incorporating correction filters to improve optical image quality and to filters for such systems.

2. Description of the Prior Art:

Typically the physical limitations of a photographic system, designed to photograph a scene, result in loss of resolution of the image of the photographed scene. This is primarily due to imperfections in the lens system of the photographic system and/or due to its movement during the photographic process. Among the ways in which loss of resolution is presented are unsharp focusing, lateral shift which results in double exposure, ring smear and linear smear.

Once a scene is photographed with a certain degree of loss of resolution, the sharp scene image cannot be reproduced unless the photographic process can be repeated, which is generally expensive and in many instances, such as in space exploration, not possible. Many photographs which are received from space exploration, such as by telemetry techniques, suffer from variable degrees of loss of resolution, thereby making the task of interpretating the photographs most difficult. Often, the loss of resolution obscures the main features which are sought by the exploring scientists. Herebefore very little if anything could be done to obtain sharp scene images from scene photographs which suffer from varying degrees of resolution loss. Thus, a need exists for a photograhic system which is capable of improving the optical quality of photographed images. Alternately stated, a need exists for correction filters which are capable of compensating for the loss of resolution of photographed images.

OBJECTS AND SUMMARY OF THE INVENTION

It is a primary object of the present invention to provide a new improved photographic system.

Another object is to provide an improved photographic system in which loss of resolution of a photographed image is at least partially corrected.

A further object of the invention is the provision of a family of correction filters for improving optical quality of a photographed image.

Yet a further object of the present invention is to provide a photographic system with a filter which is designed to correct at least partially for the loss of resolution of a photographed scene.

These and other objects of the present invention are achieved by providing a filter in a photographic system in which a scene photograph with reduced resolution is scanned. Light from the scanned photograph is directed to the filter which is designed, based on the particular cause of the resolution loss. The filter includes a first filter element with a pinhole through which light passes to a differential amplifier. The filter also includes a second filter element through which light passes through one or more openings whose geometric configuration is a function of the cause of the resolution loss. The light passing through the second filter element is also supplied to the differential amplifier whose output is used to activate an optical display or recorder to produce a photograph or display of the scene in the original photograph with resolution which is significantly greater than that characterizing the original photograph.

The novel features of the invention are set forth with particularity in the appended claims. The invention will best be understood from the following description when read in conjunction with the accompanying drawings.

BRIEF DESCRIPTION OF THE DRAWINGS

FIG. 1 is an optical configuration of a photographic system;

FIG. 2 is a chart of the transformation of a point in an input plane into a corresponding pattern in an image plane for four different optical systems;

FIG. 3 is a block diagram useful in explaining the basic principles of the present invention;

FIGS. 3a, 3b, 4, 5a, 5b, 5c, 5d and 6 are diagrams useful in explaining one embodiment of the invention;

DESCRIPTION OF THE PREFERRED EMBODIMENTS

Figure 3B:
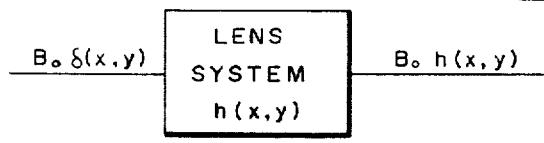

Before proceeding to describe specific embodiments of the present invention the basic analysis and principles underlying the present invention will first be presented. A photographic system may be characterized be a modulation transfer function (MTF) which is the Fourier transform of the system response to a unit impulse of light. Under ideal situations, the output picture is identical to the photographed scene and therefore, the MTF is equal to unity for all frequencies. However, as previously mentioned, physical limitations of the photographic system result in loss of resolution thereby producing a picture which is not identical to the photographed scene. In other words, the MTF of the system is not equal to unity for all frequencies.

Briefly stated, in accordance with this invention the light from the photograph is passed through a corrective filter whose transfer function together with that of the MTF of the photographic system are equal or approach unity, thereby correcting for the resolution loss. Hereafter, the MTFs for photographic systems characterized by defocusing, lateral shift with double exposure, ring smear and linear smear will be derived as well as the transfer functions and the features of the filters required for correcting such systems. It should be appreciated that based on the teachings to be desribed hereafter in detail, the manner of deriving the transfer function and features of a filter needed to correct for loss of resolution of any system whose MTF is derivable will become apparent. Thus, the invention is not intended to be limited to the specific examples which will be detailed.

As an introduction to the teachings of the present invention, attention is directed to FIG. 1 which is a simple optical configuration of a photographic system. Consider a two-dimensional scene located in the input plane 10 of FIG. 1. It can be described by the distribution of its luminous energy $b(x, y)$. By means of a lens system 12 this scene is imaged onto an image plane 14 where its luminous energy distribution may be described by the intensity function $p(x, y)$. The scene and the image can then be related by the expression $$p(x, y) = \int_{-\infty}^{\infty} \int_{-\infty}^{\infty} b(x', y') \cdot h(x-x', y-y') dx' dy', \quad (1)$$

where $h(x, y)$ is the response of the lens system 12 to a unit impulse of light which characterizes the behavior of the system completely. The Fourier transform of $h(x, y)$ is often referred to as the MTF of the system.

By transforming the two-dimensional spatial distribution function into the two-dimensional spatial frequency domain using the relation $$F[b(x, y)] = B(\omega_x, \omega_y)$$
$$= \int_{-\infty}^{\infty} \int_{-\infty}^{\infty} b(x, y) \cdot \exp[-2\pi j(\omega_x x + \omega_y y)] dx dy, \quad (2)$$

the spatial frequency spectrum of the intensity distribution, $b(x,y)$, can be obtained.

Similarly, the Fourier transform of the impulse response (MTF) is $$H(\omega_x, \omega_y) = \int_{-\infty}^{\infty} \int_{-\infty}^{\infty} h(x, y) \cdot \exp[-2\pi j(\omega_x x + \omega_y y)] dx dy. \quad (3)$$

Thus, as in the one dimensional case, the transformation of the convolution or equation (1) reduces to a multiplication $P(\omega_x, \omega_y) = B(\omega_x, \omega_y) H(\omega_x, \omega_y)$. (4)

For this application equation (1) and (4) are equivalent, but under given conditions one or the other of them may be more convenient. If a scene is passed through only one system, the output picture can be obtained using equation (1) by a single integration, whereas equation (4) requires two integrations for the calculation of Fourier transforms. On the other hand, if the scene passes through several systems, the use of equation (1) requires a separate integration for each system while equation (4) permits the several systems to be included by a simple multiplication of their system functions, and there remain only two integrations to be performed: the Fourier transformation of the input and the inverse Fourier transformation of the final output. Furthermore, analysis in the spatial frequency domain has other advantages well known from the frequency analysis of an electrical network.

To calculate the modulation transfer functions for the various optical systems, consider the intensity distribution $p(x,y)$ on the image plane produced from a point source of light, $B_0\delta(x,y)$ which will be defined hereafter in the input plane. The modulation transfer function and the normalized modulation transfer function are defined as $$H(\omega_x, \omega_y) = \frac{\int_{-\infty}^{\infty} \int_{-\infty}^{\infty} p(x, y) \cdot \exp[-2\pi j(\omega_x x + \omega_y y)] dx dy}{B_0} \quad (5)$$

and $H_n(\chi_x, \omega_y) = H(\omega_x, \omega_y)/H(\omega_x = 0, \omega_y = 0)$ (6)

respectively, where the denominator of equation (6) normalizes the transfer function to unity at zero frequency. By using equations (5) and (6), the modulation transfer functions and the normalized modulations transfer functions for systems with resolution loss may be derived. Hereafter these equations will be used to derive the MTFs and the normalized MTFs for the defocused, laterally shifted, ring smearing and linear smearing optical systems. FIG. 2 shows the transformation of a point source in the input plane into the appropriate pattern in the image plane, for these four optical systems.

The question that comes to mind at this point is what kind of a correction filter is needed to compensate for an optical system whose normalized MTF is not equal to unity for all frequencies (that is, the output picture is identical to the scene). To obtain such a correction filter, consider the system representation shown in FIG. 3. If a scene is described by its light intensity function $b(x,y)$, then the photographic system with impulse response function $h(x,y)$ acts upon $b(x,y)$, all $x$ and all $y$, obtaining the received picture $p(x,y)$ as herebefore described.

$$p(x, y) = \int_{-\infty}^{\infty} \int_{-\infty}^{\infty} b(x', y') h(x-x', y-y') dx' dy', \quad (7)$$

or in spatial frequency domain $$P(\omega_x, \omega_y) = B(\omega_x, \omega_y) \cdot H(\omega_x, \omega_y), \quad (8)$$

where $B(\omega_x, \omega_y)$, $H(\omega_x, \omega_y)$ and $P(\omega_x, \omega_y)$ are the Fourier transforms corresponding to the scene, photographic system and received picture, respectively. By a similar analysis, a filter $f(x,y)$ to improve the received picture by convolution gives the improved picture $$r(x, y) = \int_{-\infty}^{\infty} \int_{-\infty}^{\infty} p(x', y') f(x-x', y-y') dx' dy', \quad (9)$$

whose Fourier transform is $$R(\omega_x, \omega_y) = P(\omega_x, \omega_y) \cdot F(\omega_x, \omega_y), \quad (10)$$

where $F(\omega_x, \omega_y)$ is the Fourier transform of the filter. Ideally, the improved picture should be identical to the scene; hence, their Fourier transform should be identical; i.e., from equations (8) and (10), $$B(\omega_x, \omega_y) = B(\omega_x, \omega_y) \cdot H(\omega_x, \omega_y) \cdot F(\omega_x, \omega_y). \quad (11)$$

Thus, $$F(\omega_x, \omega_y) = 1/H(\omega_x, \omega_y). \quad (12)$$

It is thus seen from equation (12) that the Fourier transform of the filter is the reciprocal of the Fourier transform of the photographic system with the limited resolution. Thus, if the latter is known or derivable, the Fourier transform of the filter can be obtained. Therefrom, the features of the filter can be determined. Hereafter, under separate headings the MTFs and the correction filters for defocused, laterially shifted, ring smearing and linear smearing optical systems will be derived.

DEFOCUSED MODULATION TRANSFER FUNCTION AND CORRECTION FILTER

Attention is first directed to FIG. 3a which is an optical configuration of a defocused or unsharply focused optical system. The system representation is shown in FIG. 3b. Therein a point source 15 at the input plane 10 is assumed to be imaged by means of the lens system 12 in the image plane 14 which, however, is not located in the focal plane 16. For the analysis of a perfect circular lens, the point source 15 will then be imaged in form of a blur circle 18. This point source 15 can be described as $$b(x,y) = B_0 \delta(x,y) \tag{13}$$

where $$\delta(x,y) = 0 \text{ for } x^2 + y^2 = 0$$

and $$\int_{-\infty}^{\infty} \int_{-\infty}^{\infty} \sigma(x,y) dx dy = 1.$$

If its blurred image assumes a uniform intensity distribution, and since for a lossless system the light power is conserved, then from FIG. 3a we have $$p(x,y) = \begin{cases} \dfrac{B_0}{a^2}\left(\dfrac{v}{u}\right)^2 & \text{for } x^2+y^2 \leq r_0^2 \\ 0 \text{ outside the circle} \end{cases} \tag{14}$$

where $r_0$ is the radius of the blurred circle 18, $B_0$ is in lumens per unit solid angle, $p(x,y)$ is in lumens per square meter, $u$ is the object distance, $v$ is the image distance and $a$ is the defocal length. To evaluate the Fourier transform of the intensity distribution we observe the circular symmetry of the configuration and note that for such a case the two-dimensional Fourier transform reduces to a Hankel transform. Hence, $$P(\omega_x,\omega_y) = 2\pi \int_0^\infty rg(r) J_0(2\pi\rho r) dr \tag{15}$$

where $g(r) = p(x,y)$ in polar coordinate, $r^2 = x^2 + y^2$, $\rho^2 = \omega_x^2 + \omega_y^2$ and $J_0$ is the Bessel function of the zero order. Furthermore, it can be shown that $$P(\omega_x,\omega_y) = G(\rho) \tag{16}$$

where $G(\rho)$ is in polar coordinates.
From the recurrence relationships $$(d/dx) J_n(x) = J_{n-1}(x) - (n/x) J_n(x) \tag{17}$$

for $n=1$, we have $$J'_1(x) = J_0(x) - [J_1(x)/x] \tag{18}$$

or $$[xJ_1(x)]' = xJ_0(x). \tag{19}$$

Therefore, $$\int_0^{x_0} xJ_0(x) dx = x_0 J_1(x_0). \tag{20}$$

Thus from equation (14) and equation (15) becomes $$G(\rho) = 2\pi \int_0^{r_0} p_0 r J_0(2\pi\rho r) dr, \tag{21}$$

where $P_0 = (B_0/a^2)(v/u)^2$. By letting $x = 2\pi\rho r$, we obtain $$G(\rho) = P_0 \int_0^{2\pi\rho r_0} \dfrac{x}{2\pi\rho^2} J_0(x) dx \tag{22}$$

or $$G(\rho) = (P_0 r_0/\rho) J_1(2\pi\rho r_0). \tag{23}$$

By inspection of FIG. 3a, $r_0/a = L/v$. Therefore, equation (23) becomes $$G(\rho) = 2\pi B_0 (L/u)^2 [J_1(2\pi\rho r_0)/2\pi\rho r_0]. \tag{24}$$

Thus, the response transfer function to a point source $B_0 \delta(x,y)$ in the image plane of FIG. 3a is described by equation (24) and $$H'(\rho) = 2\pi(L/u)^2 [J_1(2\pi\rho r_0)/2\pi\rho r_0] \tag{25}$$

is the modulation transfer function of a defocused optical system. By applying equation (6), the normalized modulation transfer function of a defocused optical system is seen to be $$H_n'(\rho) = [2J_1(2\pi\rho r_0)]/2\pi\rho r_0. \tag{26}$$

Figure 4:
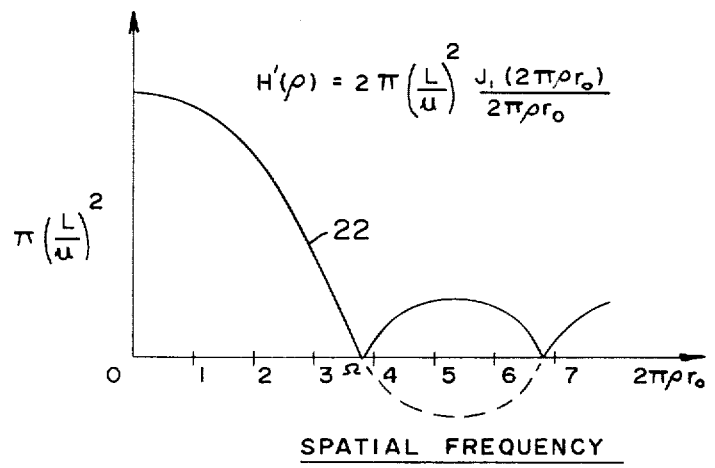

The plot of the modulation transfer function is shown in FIG. 4. Note that in the case of coherent light the transfer function goes negative, whereas with incoherent light, which is the common case, the phase information is lost and only the intensity information is detectable. The modulation transfer function indicated reflects the physical characteristics of a lowpass filter. As a result, high spatial frequency information, i.e., fine detail of the image, gets attenuated. It should also be noted that the zeros of the response depend on the defocal distance $a$, and $a$ is directly proportional to the radius of the blurred circle $r_0$.

As previously discussed and expressed in equation (12), the Fourier transform of a filter needed to correct for an optical system with limited resolution is the reciprocal of the system's MTF. Thus, in the present example to correct for the defocused system whose Fourier transform is expressed in equation (25), a filter whose Fourier transform is a reciprocal of $H'(\rho)$ is required. Such Fourier transform may be expressed as $$F'_d(\rho) = \left[\dfrac{1}{2\pi p_0 r_0^2}\right] \left[\dfrac{2\pi\rho r_0}{J_1(2\pi\rho r_0)}\right] \tag{27}$$

where $P_0 = (B_0/a^2)(u/v)^2$.

The problem now reduces to the synthesis of a filter having such a Fourier transform. Note that the transfer function of a circular aperture of radius $r'$ can be shown to be $$G_0(\rho) = [K_0 J_1(2\pi r'\rho)]/2\pi r'\rho \qquad (28)$$

where $K_0 = t2\pi P_0(r')^2$, $r'$ is the radius of the circular aperture, $t$ is the value of transmission ($t<1$) and $P_0$ is defined in equation (21).

A pinhole can be considered as an impulse function and its transfer function is a constant, and can be expressed as $$G_i(\rho) = c_0 K_0 \qquad (29)$$

where $c_0$ is a constant, greater than unity by construction. Thus by subtracting the light passing through the circular aperture from that passing through the pinhole, a filter is produced whose transfer function may be expressed as $$G_c(\rho) = K_0 [c_0 - J_1(2\pi r'\rho)/2\pi r'\rho] \qquad (30)$$

Figure 5A:
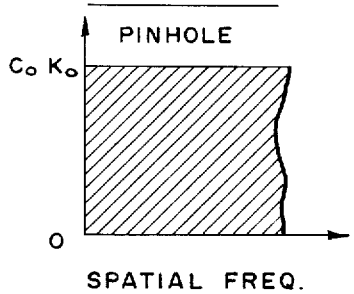
Figure 5B:
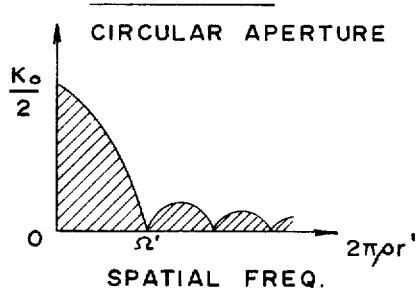
Figure 5C:
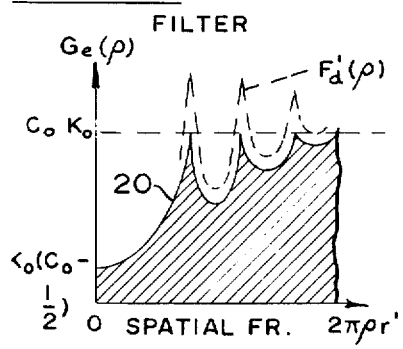

A graphical interpretation of this analysis and the resulting filter is shown in FIGS. 5a, 5b and 5c, which respectively represent the transfer functions of a pinhole, a circular aperture and the filter formed by the combination of the two. In FIG. 5c, the dashed line represents the Fourier transform $F'(p)$ of the ideal filter as expressed in equation (27).

Figure 5D:
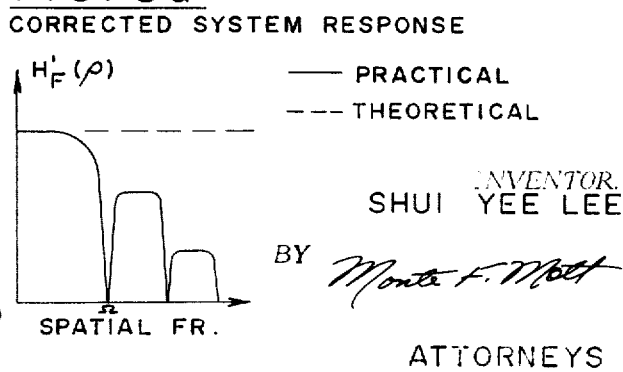

As seen from FIG. 5c, $G_c(\rho)$, i.e., the filter transfer function has the characteristics of a high-pass filter as indicated by line 20 in FIG. 5c. It should thus be appreciated that such a filter can indeed compensate at least approximately for the following characteristics of the defocused optical system as shown in FIG. 4 wherein the falling off characteristic is represented by line 22. The resulting transfer function $H'_F(\rho)$ is shown in FIG. 5d.

It should be noted that with the practical filter correction is accomplished for spatial frequencies up to $\Omega = \arg(J_1 = 0)$ which is the defraction limit frequency, while if the theoretical filter were used it would compensate the system for all spatial frequencies. This is analogous to the case of a realizable electrical network, where approximate compensation can be achieved up to a certain predictability limit.

It should be pointed out that optimum compensation is achieved if the radius of the circular aperture which controls $\Omega'$ in FIG. 5b is chosen to be equal to the radius of the blur circle which controls $\Omega$ in FIG. 4. That is it is desirable to make $\Omega = \Omega'$.

Figure 6:
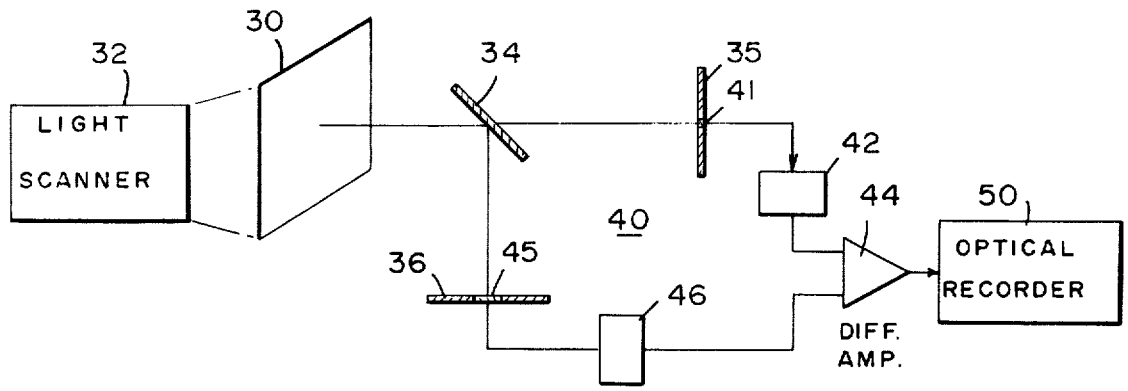

The manner in which the aforedescribed filter is implemented and used may best be described in connection with FIG. 6. Therein, numeral 30 designates a defocused optical record such as defocused photograph of a scene. This photograph is scanned by light from a light scanner 32 such as a flying spot scanner, with the light passing through each scanned area of photograph 30 being directed to a light beam splitter 34. Therefrom the light is directed separately to two filter elements 35 and 36 which form the filter 40 of the present invention.

Element 35 defines a pinhole 41 through which the light passes to a photosensor 42, whose electrical output is supplied to one input of a differential amplifier 44. Element 36 defines a circular aperture 45 through which light passes to a photosensor 46 whose electrical output is supplied to a differential amplifier 44. The latter provides an electrical output whose amplitude is a function of the difference between the outputs of the two photosensors. It is the output of amplifier 44, which controls the intensity of recording in an optical recorder or display 50. The latter may assume the form of an oscilloscope in which the output of amplifier 44 controls beam intensity. The output of recorder 50 is in essence a photograph similar to that of photograph 30 except for increased resolution or alternately stated one in which defocusing has been either completely eliminated or substantially reduced.

In practice the pinhole 41 is made as small as possible, while the radius of aperture 45 is preferably made "tuneable," so that it can be adjusted to equal the radius of the blur circle which is the response of a defocused optical system to a point source of light.

LATERALLY SHIFTED MODULATION TRANSFER FUNCTION AND CORRECTION FILTER

Figure 7A:
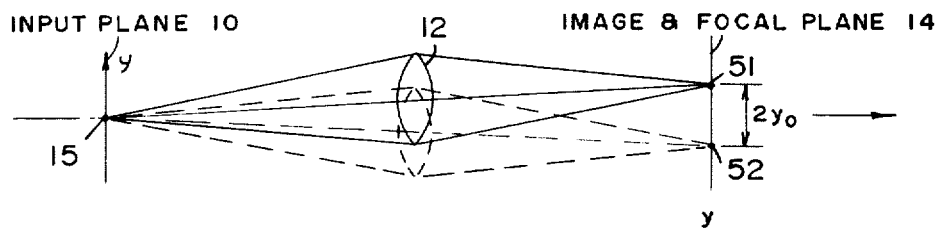
FIGS. 7a, 7b, 8 and 9 are diagrams useful in explaining a second embodiment of the invention.

Attention is now directed to FIG. 7a which is similar to FIG. 3a and which is a schematic diagram useful in explaining lateral shift. Therein, the point source 15 and the input plane 10 is emerged by means of the lens system 12 in the image plane 14 which is also the focal plane. However, due to a lateral movement of the lens system 12, a double exposed copy of the input with a shift in the $y$ direction is recorded in the form of two laterally disposed points 51 and 52. To evaluate the modulation transfer function for this laterally shifted optical system, first let the intensity of the input be described by equation (13). Then after two exposures, the intensity distribution of the double image of the input in the image plane will be $$p(x,y) = [\delta(x,y+y_0) + \delta(x,y-y_0)](B_0/2) \qquad (31)$$

where the distance $2y_0$ is the separation of the double image. Note that the shifting property of an impulse function is expressed as $$\int_{-\infty}^{\infty} f(y)\delta(y-a)dy = f(a). \qquad (32)$$

Therefore, applying the definition of equation (5), the modulation transfer function of the laterally shifted optical system is $$H(\omega_x, \omega_y) = \frac{1}{2}\int_{-\infty}^{\infty}\int_{-\infty}^{\infty} [\delta(x, y+y_0) + \delta(x, y-y_0)]e^{-2\pi i(\omega_x x + \omega_y y)}dxdy = \frac{e^{-j2\pi y_0 \omega_y} + e^{j2\pi y_0 \omega_y}}{2} \qquad (33)$$

or $$H(\omega_x, \omega_y) = \cos 2\pi y_0 \omega_y .$$

(34)

Figure 7B:
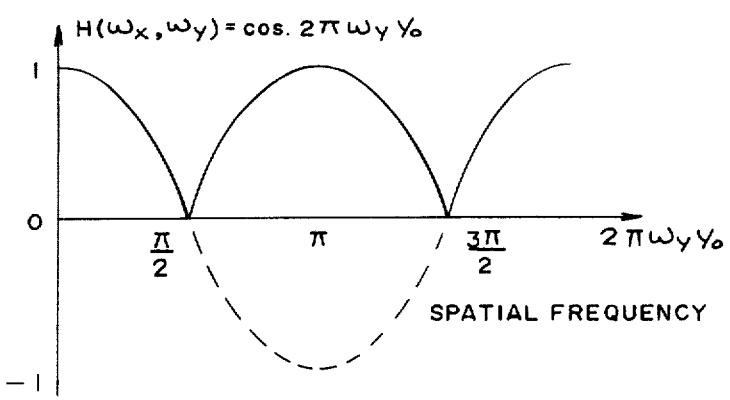
Figure 8:
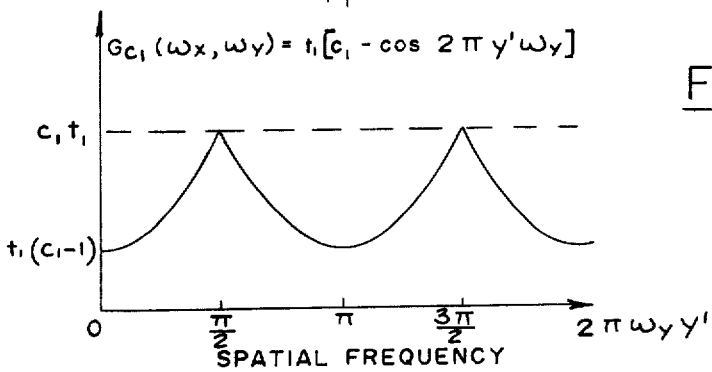

From equation (6) and since $H(\omega_x=0, \omega_y=0)=1$, the normalized modulation transfer function $H_n(\omega_x,\omega_y)$ for the laterally shifted system is identical to $H(\omega_x,\omega_y)$ of equation (34). The plot of the modulation transfer function is shown in FIG. 7b. Note that again in the case of coherent light the transfer function goes negative, whereas with incoherent light (the common case) the phase information is lost and only the intensity information is detectable. The plot also shows that some spatial frequency information gets attenuated. Furthermore, the zeros of the response depends upon the separation distance, $2y_0$, of the double image.

Based on equation (12) it should thus be appreciated that the transfer function of the required filter is the reciprocal of $H(\omega_x,\omega_y)$ in equation (34) and therefore can be expressed as $$F_{1s}(\omega_x,\omega_y) = 1/\cos 2y_0\omega_y$$

(35)

Using the synthesis technique hereinbefore employed in connection with filter 40 (see FIG. 6) it can be shown that the transfer function expressed in equation 35 is approximated by a filter having a first element with a pinhole and a second element with two pinholes spaced apart a distance related to $2y_0$ in FIG. 7a. As before, the combination of the two is a filter transfer function $$G_c(\omega_x,\omega_y) = t_1[c_1 - \cos 2\pi y'\omega_y]$$

(36)

where $c_1 t_1$ is the transmission value of the single pinhole element, $t_1$ is the transmission value of the element with two pinholes, and $c_1$ is greater than unity. Such a filter, when combined with the laterally displaced optical system, provides substantial correction for the lateral displacement.

Figure 9:
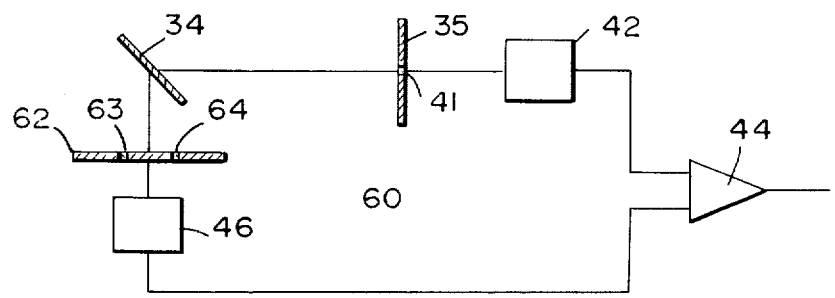

In practice the filter, designated by numeral 60 in FIG. 9, is in filter 60, a filter element 62 with two spaced pinholes 63 and 64 replace element 36 of filter 40. Preferably the spacing $2y'$ between pinholes 63 and 64 is made a variable to relate to the spacing $2y_0$ between double exposed points 51 and 52, shown in FIG. 7a.

MODULATION TRANSFER FUNCTION FOR RING SMEARING AND CORRECTIVE FILTER

Ring smearing occurs when lens system 12 (see FIG. 10a) is moved in a circular path during exposure so that the point source 15 at the input plane 10 is smeared into a circle 70 at the image plane 14 which is also the focal plane.

Figure 10A:
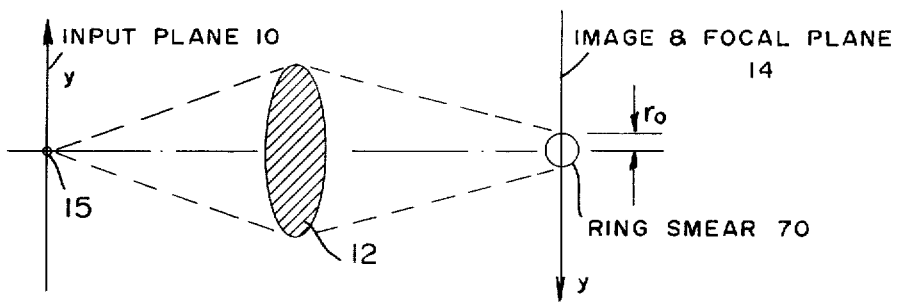
FIGS. 10a, 10b, 11 and 12 are diagrams useful in explaining a third embodiment of the invention.

Let the input intensity function be a point with unit strength, so that $h(x,y)=\delta(x,y)=h'(r,\phi)$. The intensity function in the image plane will be $p(r,\phi)=\delta(r-r_0)$, independent of $\phi$ as shown in FIG. 10a. As with the cases of the defocused and laterally shifted transfer functions, the modulation transfer function of the ring smearing optical system can be calculated as follows:

$$H'(\rho) = \int_0^{2\pi}\int_0^{r_0} p(r,\phi) e^{-2\pi j r\rho \cos(\phi-\psi)} r dr d\phi$$

(37)

or $$H'(\rho) = \int_0^{2\pi}\int_0^{r_0} \delta(r-r_0) e^{-2\pi j r\rho \cos(\phi-\psi)} r dr d\phi.$$

(38)

From equation (32), equation (38) becomes $$H'(\rho) = \int_0^{2\pi} e^{-2\pi j r_0\rho \cos(\phi-\psi)} r_0 d\phi = 2\pi r_0 J_0(2\pi r_0\rho).$$

(39)

Since $H'(\rho=0)=2\pi r_0$, from equation (6) the normalized modulation transfer function of the ring smearing optical system becomes $$H'_n(\rho) = J_0(2\pi r_0\rho).$$

(40)

Figure 10B:
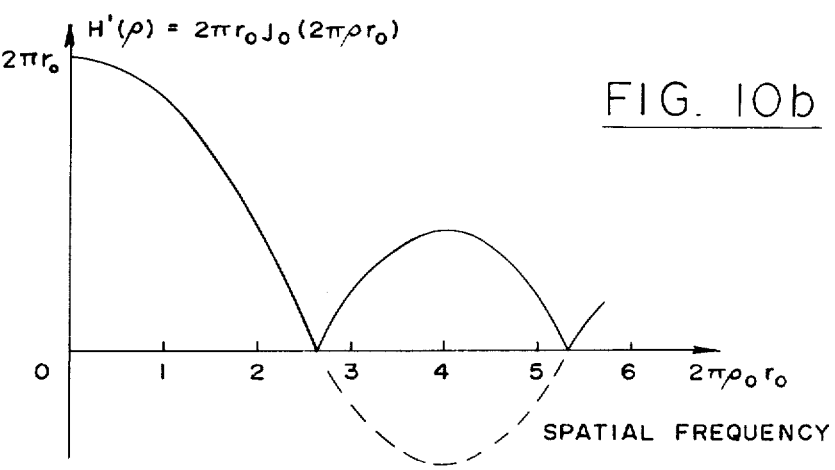

The plot of the modulation transfer function is shown in FIG. 10b. Note that again for coherent light the transfer function goes negative whereas for incoherent light the phase information is lost and only intensity information is detectable. The plot shows that ring smearing acts as a lowpass filter, as in the case of unsharp focus. The zeros of the response transfer function depend on $r_0$.

From equations (12) and (39), it is seen that the transfer function from the required filter is $$F'_{rs}(\rho) = 1/[2\pi r_0 J_0(2\pi r_0\rho)].$$

(41)

This transfer function may be approximated by a filter which has one filter element with a pinhole of transmission value $k_2 c_2$ and a second filter element with a ring-shaped aperture of an inner radius $r'$ of transmission $t_2$. The transfer function of this filter may be expressed as $$G_{c_2}(\rho) = k_2 = [c_2 - J_0(2\pi r'\rho)]$$

(42)

where $k_2=t_2 2\pi r'$, and $c_2$ is a constant related to the pinhole.

Figure 11:
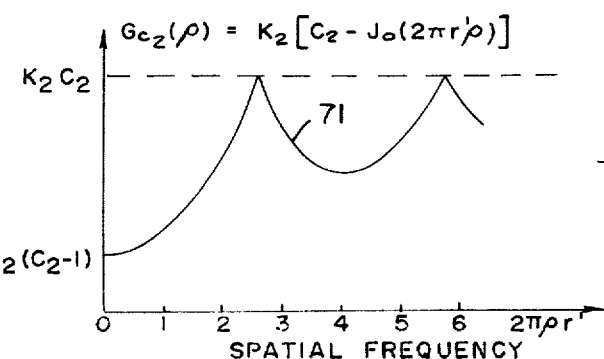
Figure 12:
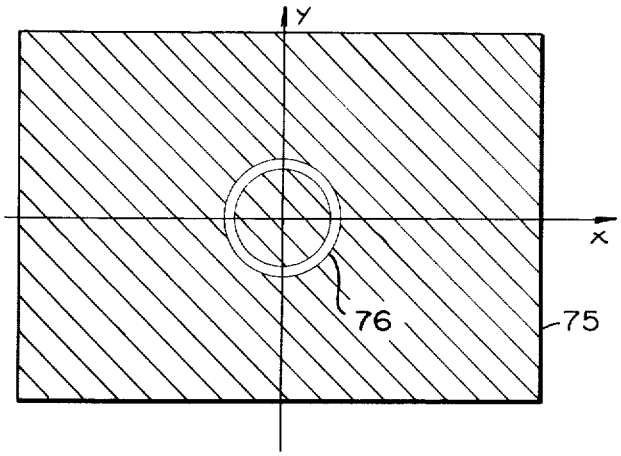

The transfer function of such a filter is diagrammed in FIG. 11 wherein the dashed line represents the response of the pinhole and the solid line 71 the overall filter response. Basically, the implemented filter is similar to filter 40 (see FIG. 6) except that filter element 36 of filter 40 is replaced by a filter element 76 shown in plain view in FIG. 12. Element 76 defines a ring-shaped aperture of inner radius $r'$. The ring thickness represented by the difference between the outer and inner radii is preferably adjustable for different magnitudes of ring smears.

LINEARLY SMEARED MODULATION TRANSFER FUNCTION AND CORRECTIVE FILTER

Figure 13A:
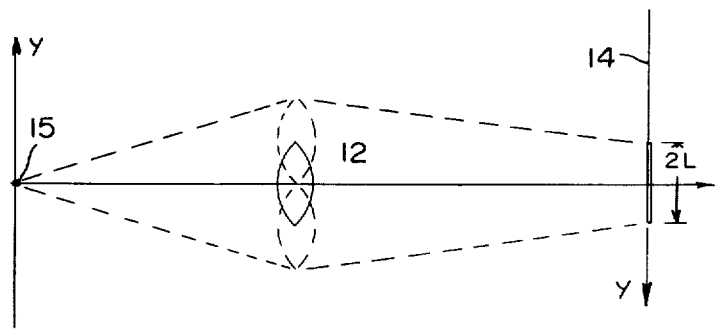

Linear smearing occurs when there is relative motion between the object and the lens system during exposure. This effect is shown in FIG. 13a and can be described as follows: The point source 15 is imaged by means of lens system 12 in the image plane 14. However, the relative motion of uniform velocity $v$ causes the point to be smeared out a length $2L=vt$ along the $y$ direction. Thus, the new image intensity distribution in the image plane can be written as $$p(x,y) = \begin{cases} I_0 & |y| \leq L \\ 0 & |y| > L \end{cases}$$

(43)

where $I_0$ is in lumens per meter. To evaluate the modulation transfer function of the linearly smeared optical system by equation (5), first observe that this is essentially a one-dimensional problem, and then for convenience let $B_0$ be unit strength; we obtain from equation (5)

$$H(\omega_x, \omega_y) = I_0 \int_{-L}^{L} e^{-2\pi j \omega_y y} dy = 2LI_0 \frac{\sin 2\pi L\omega_y}{2\pi L\omega_y}.$$

(44)

From equation (6) and since $H(\omega_x=0, \omega_y=0) = 2LI_0$, the normalized modulation transfer function $H_n(\omega_x, \omega_y)$ for the linearly smeared optical system is $$H_n(\omega_x, \omega_y) = \sin 2\pi L\omega_y / 2\pi L\omega_y.$$

(45)

Figure 13B:
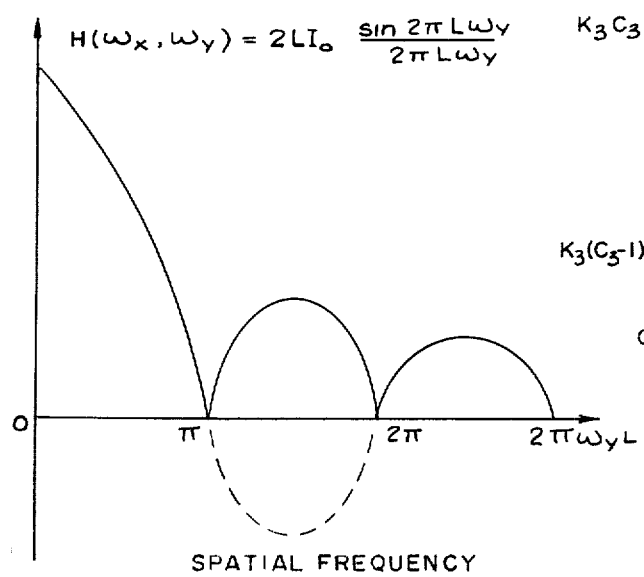

The plot of the modulation transfer function is shown in FIG. 13b. Note that as in other cases, for coherent light the transfer function goes negative whereas for incoherent light the phase information is lost and only intensity information is detectable. The plot shows that linear smearing acts as a lowpass filter, as in the case of unsharp focus and ring smearing. The zeros of the response function depend on L.

From equations (12) and (45) it is seen that the transfer function of the ideal or theoretical corrective filter is $$F_{lis}(\omega_x, \omega_y) = (1/2LI_0)(2\pi L\omega_y / \sin 2\pi L\omega_y).$$

(46)

This theoretical filter may be synthesized into a practical filter with a pinhole in one element and a second element with a rectangularly-shaped aperture of length $2L'$. The transfer function of such a filter may be expressed as $$F_c(\omega_x, \omega_y) = k_3[c_3 - (\sin 2\pi L'\omega_y / 2\pi L' \omega_y)],$$

(47)

where $k_3 = t_3 2L' I_0$, $2L'$ is the length of the rectangularly shaped aperture, $I_0$ is in lumens per meter, $c_3$ is a constant greater than one and $t_3$ is the transmission value of the rectangularly shaped aperture.

Figure 15:
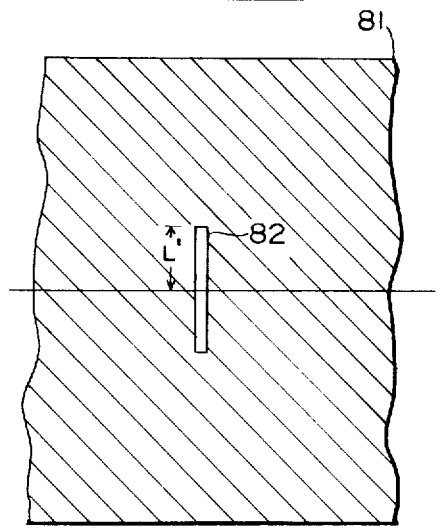
FIGS. 13a, 13b, 14 and 15 are diagrams useful in explaining a fourth embodiment of the invention.
Figure 14:
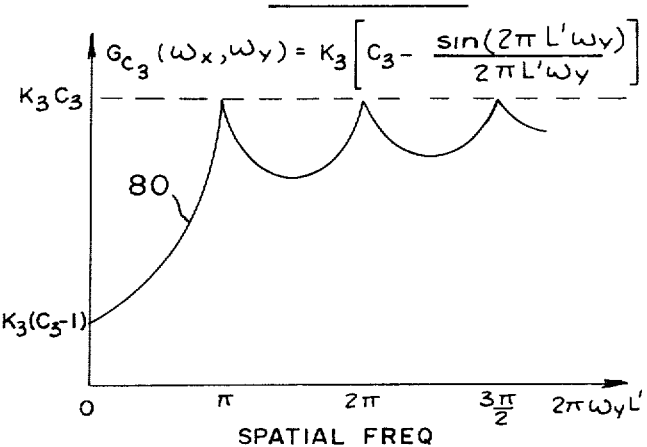

The transfer function of such a filter is shown in FIG. 14 wherein the dashed line represents the response of the pinhole and line 80 the total filter response. In practice, the corrective filter is similar to filter 40 (see FIG. 6) except that filter element 36 is replaced by a filter element 82 (see FIG. 15) with a rectangularly-shaped aperture of length $2L'$. The length of the filter is adjustable to equal the smear length $2L$ (see FIG. 13a). The width of the aperture 82 should be made adjustable so that optimum compensation of various degrees of linear smears can be achieved.

From the foregoing it is thus seen that common to all four filters herebefore described is one element with a pinhole. Each filter includes a second element whose aperture geometry depends on the particular defect which is to be corrected. To correct unsharpness the second filter element includes circular aperture. A laterally-shifted, double exposure picture is correctable by a filter whose second element defines two pinholes, while ring smearing can be corrected by a second filter element with a ring-shaped aperture. Likewise linear smear can be corrected by a filter with a second element which defines a rectangularly shaped aperture.

The foregoing teachings may be generalized for corrective filters for other phenomena which cause a reduction or loss of resolution. Basically each filter includes a first filter element with a pinhole aperture through which light from the scanned low resolution photograph. In addition the filter includes a second element with an aperture configuration which has a transfer function substantially similar to that of the low resolution optical system to be corrected. By subtracting the transfer function of the aperture of the second element from the pinhole, a transfer function which is effectively the reciprocal of the low resolution system to be corrected is produced. As previously pointed out, such a transfer function is required for optimum correction.

Although herebefore each filter has been described as comprising two separate elements, it should be apparent that when possible one element can be used as long as it defines a pinhole aperture and the other required aperture and the light passing through the two is effectively subtracted as herebefore taught.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. An optical system comprising:
    a photographic record of a scene;
    light source means for scanning said record;
    filter means for receiving light from said scanned record, said filter means defining a pinhole aperture characterized by a substantially constant Fourier transform in response to a unit impulse of light and at least one other aperture whose configuration is a function of the characteristics of said scene record with light from said scanned record passing through said pinhole aperture and said other aperture; and
    means for providing an output which is a function of the difference of the light passing through said pinhole aperture and said other aperture, said record being of low resolution due to scene double exposure and said at least one other aperture comprising a pair of pinholes spaced a distance related to said double exposure.

2. The system as recited in claim 1 wherein said filter comprises a first filter element defining said pinhole aperture and a second filter element defining said pair of pinholes.

3. An optical system comprising:
    a photographic record of a scene;
    light source means for scanning said record;
    filter means for receiving light from said scanned record, said filter means defining a pinhole aperture characterized by a substantially constant Fourier transform in response to a unit impulse of light and at least one other aperture whose configuration is a function of the characteristics of said scene record with light from said scanned record passing through said pinhole aperture and said other aperture; and
    means for providing an output which is a function of the difference of the light passing through said pinhole aperture and said other aperture, said record being of low resolution due to linear smear and said at least one other aperture being rectangularly shaped.

4. The system as recited in claim 3 wherein said filter comprises a first filter element defining said pinhole aperture and a second filter element defining said rectangularly-shaped aperture.

5. A system for correcting the content of a scene photographically recorded on an optical record of low resolution by an optical system having a determinable modulation transfer function, which is other than unity, the system comprising:

light scanning means for scanning the scene recorded on said optical record, with the light from said scanned scene being directed in a selected direction;

a filter in said selected direction for passing the light in said direction therethrough, said filter being characterized by a modulation transfer function which is related to the modulation transfer function of said optical system with which said scene was recorded, said filter defining a pinhole aperture through which light from said scanned scene is transmitted and at least one other aperture through which light from said scanned area is transmitted; and output means for providing an output which is a function of the light transmitted through said pinhole aperture and said at least one other aperture, wherein said at least one other aperture consists of a pair of spaced adjustable pinholes.

6. A system for correcting the content of a scene photographically recorded on an optical record of low resolution by an optical system having a determinable modulation transfer function, which is other than unity, the system comprising:

light scanning means for scanning the scene recorded on said optical record, with the light from said scanned scene being directed in a selected direction;

a filter in said selected direction for passing the light in said direction therethrough, said filter being characterized by a modulation transfer function which is related to the modulation transfer function of said optical system with which said scene was recorded, said filter defining a pinhole aperture through which light from said scanned scene is transmitted and at least one other aperture through which light from said scanned area is transmitted; and output means for providing an output which is a function of the light transmitted through said pinhole aperture and said at least one other aperture, wherein said at least one other aperture is a single rectangularly-shaped aperture of adjustable width.

7. A system for correcting the content of a scene photographically recorded on an optical record of low resolution by an optical system having a determinable modulation transfer function, which is other than unity, the system comprising:

light scanning means for scanning the scene recorded on said optical record, with the light from said scanned scene being directed in a selected direction;

a filter in said selected direction for passing the light in said direction therethrough, said filter being characterized by a modulation transfer function which is related to the modulation transfer function of said optical system with which said scene was recorded, said filter defining a pinhole aperture through which light from said scanned scene is transmitted and at least one other aperture through which light from said scanned area is transmitted; and output means for providing an output which is a function of the light transmitted through said pinhole aperture and said at least one other aperture, said filter comprising a first filter element defining said pinhole aperture, a second filter element defining said at least one other aperture, means for directing light from said optical record to said first and second filter elements, said output means comprise differencing means for providing said output as a function of the difference between the light transmitted through said pinhole aperture and said at least one other aperture, and wherein said at least one other aperture consists of a pair of spaced adjustable pinholes.

8. A system for correcting the content of a scene photographically recorded on an optical record of low resolution by an optical system having a determinable modulation transfer function, which is other than unity, the system comprising:

light scanning means for scanning the scene recorded on said optical record, with the light from said scanned scene being directed in a selected direction;

a filter in said selected direction for passing the light in said direction therethrough, said filter being characterized by a modulation transfer function which is related to the modulation transfer function of said optical system with which said scene was recorded, said filter defining a pinhole aperture through which light from said scanned scene is transmitted and at least one other aperture through which light from said scanned area is transmitted; and output means for providing an output which is a function of the light transmitted through said pinhole aperture and said at least one other aperture, wherein said filter comprises a first filter element defining said pinhole aperture, a second filter element defining said at least one other aperture, means for directing light from said optical record to said first and second filter elements, wherein said output means comprise differencing means for providing said output as a function of the difference between the light transmitted through said pinhole aperture and said at least one other aperture, and wherein said at least one other aperture is a single rectangularly-shaped aperture of adjustable width.

* * * * *